No. 799,241. PATENTED SEPT. 12, 1905.
R. L. KILLINGSWORTH.
PLOW.
APPLICATION FILED MAY 11, 1905.

Witnesses
Forrest G. Smith
C. H. Griesbauer

Inventor
R. L. Killingsworth
by H. B. Willson
Attorney

UNITED STATES PATENT OFFICE.

ROBERT LEE KILLINGSWORTH, OF BAZETTE, TEXAS.

PLOW.

No. 799,241.     Specification of Letters Patent.     Patented Sept. 12, 1905.

Application filed May 11, 1905. Serial No. 259,941.

*To all whom it may concern:*

Be it known that I, ROBERT LEE KILLINGSWORTH, a citizen of the United States, residing at Bazette, in the county of Navarro and State of Texas, have invented certain new and useful Improvements in Plows; and I do declare the following to be a full, clear, and exact description of the invention, such as will enable others skilled in the art to which it appertains to make and use the same.

My invention is an improved plow especially adapted for use in plowing down listed or bedded land to reduce the same to a level and also adapted for other purposes; and it consists in the construction, combination, and arrangement of devices hereinafter described and claimed.

Figure 1:
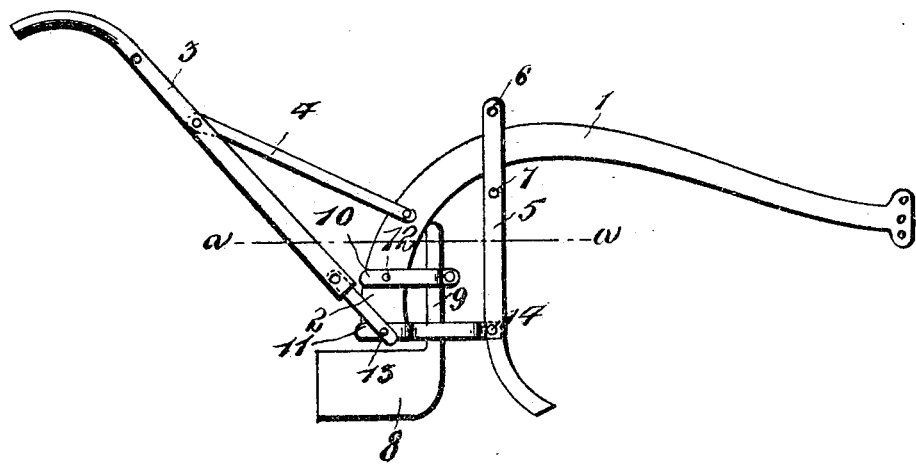
Figure 2:
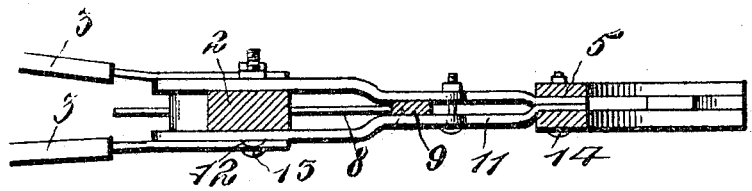

In the accompanying drawings, Figure 1 is a side elevation of a plow embodying my improvements; and Fig. 2 is a horizontal sectional view of the same, taken on the plane indicated by the line $a\ a$ of Fig. 1.

The beam 1 may be of the form here shown or of any other suitable form. It is provided at its rear end with a downturned standard portion 2, to the lower end of which are attached the lower ends of the handles 3, which are braced by means of the braces 4.

The standard 5, which carries a sweep or shovel of any suitable form, is secured to the beam 1 by means of bolts 6 7, which admit of its vertical adjustment and also enable it to be disposed either in a vertical position or at any suitable angle. The said standard 5 is in advance of the standard portion 2 of the plow-stock.

In rear of the standard 5 is a vertically-disposed knife-blade or cutter 8, which is provided with a vertical upwardly-extending arm 9 at its front end that is disposed in advance of the standard portion 2 of the stock and is secured thereto by means of clamp-bars 10 11, respectively, secured to the standard 2 by bolts 12 13, the front end of the clamp-bars 11 being extended forwardly and pivotally connected to the lower portion of the standard 5 by a bolt 14. The clamp-bars serve to secure the cutter or blade 8 at any desired vertical adjustment. It will be understood that the said cutter or blade runs in rear of the sweep or shovel carried by the standard 5 and serves to steady the plow and prevent it from moving sidewise, while the sweep or shovel is used for breaking down the listed ridges or beds in the soil.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In combination with a plow-stock having a beam and a standard portion, a standard 5 secured to the beam, in advance of the standard portion, clamp-bars on the latter, one of said clamp-bars being connected to and serving to brace the standard 5, and a vertically-disposed knife or cutter blade having an upwardly-extending arm at its front end secured between said clamp-bars, substantially as described.

2. In combination with a plow-stock having a beam and a standard portion, a standard 5 secured to the beam, in advance of the standard portion, clamp-bars on the latter, one of said clamp-bars being connected to and serving to brace the standard 5 and a vertically-disposed knife or cutter blade having an upwardly-extending arm at its front end secured between said clamp-bars, said standard 5 and said cutter or knife blade being vertically adjustable.

In testimony whereof I have hereunto set my hand in presence of two subscribing witnesses.

ROBERT LEE KILLINGSWORTH.

Witnesses:
   J. L. BREWER,
   I. J. KYSER.